United States Patent
Park et al.

(10) Patent No.: US 9,684,361 B2
(45) Date of Patent: Jun. 20, 2017

(54) DEVICES ROUTING WAKEUP SIGNALS USING PHYSICAL LAYER DIRECTLY TO POWER MANAGEMENT CIRCUIT WITHOUT WAKING UP LINK LAYER

(71) Applicants: Hyun Tae Park, Suwon-si (KR); Je Hyuck Song, Seoul (KR); Jong Kyun Min, Incheon (KR); Chang Duck Lee, Seoul (KR); Hyun Kyu Jang, Yongin-si (KR)

(72) Inventors: Hyun Tae Park, Suwon-si (KR); Je Hyuck Song, Seoul (KR); Jong Kyun Min, Incheon (KR); Chang Duck Lee, Seoul (KR); Hyun Kyu Jang, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 86 days.

(21) Appl. No.: 14/599,054

(22) Filed: Jan. 16, 2015

(65) Prior Publication Data

US 2015/0205339 A1   Jul. 23, 2015

(30) Foreign Application Priority Data

Jan. 22, 2014   (KR) .................. 10-2014-0007877

(51) Int. Cl.
*G06F 1/00* (2006.01)
*G06F 1/32* (2006.01)

(52) U.S. Cl.
CPC .......... *G06F 1/3287* (2013.01); *G06F 1/3278* (2013.01); *Y02B 60/126* (2013.01); *Y02B 60/1282* (2013.01)

(58) Field of Classification Search
CPC ...................................... G06F 1/3203
USPC ........................................... 713/323
See application file for complete search history.

(56) References Cited

U.S. PATENT DOCUMENTS

| 6,163,848 A | 12/2000 | Gephardt et al. |
| 6,366,957 B1 * | 4/2002 | Na .................. G06F 1/266 709/229 |
| 6,443,891 B1 * | 9/2002 | Grevious ............ A61B 5/0002 128/903 |
| 7,343,498 B2 | 3/2008 | Morrow |

(Continued)

FOREIGN PATENT DOCUMENTS

| KR | 20110087274 A | 8/2011 |
| KR | 1205324 B1 | 11/2012 |
| KR | 20130081666 A | 7/2013 |

OTHER PUBLICATIONS

MIPI Alliance; Physical Layer Specifications; May 11, 2012; pp. 3.*

(Continued)

*Primary Examiner* — Suresh Suryawanshi
(74) *Attorney, Agent, or Firm* — Harness, Dickey & Pierce, PLC

(57) ABSTRACT

In a method of operating a device, signals associated with wakeup of the device are detected using a first physical layer among a plurality of physical layers, and a detection signal is generated based on the detected signals. The detection signal is transmitted directly to a power management circuit. The first physical layer is included in logical lane #0 or physical lane #0.

20 Claims, 8 Drawing Sheets

(56) References Cited

U.S. PATENT DOCUMENTS

| | | | |
|---|---|---|---|
| 8,345,673 B1 * | 1/2013 | Lo | G06F 1/3209 370/366 |
| 8,352,764 B2 * | 1/2013 | Tan | G06F 1/3287 713/300 |
| 8,392,745 B2 | 3/2013 | Goodemote et al. | |
| 8,448,001 B1 | 5/2013 | Zhu et al. | |
| 8,589,606 B2 * | 11/2013 | Chiba | H04L 25/0272 710/16 |
| 8,761,209 B1 * | 6/2014 | Brown | H04L 12/413 370/535 |
| 8,819,462 B2 * | 8/2014 | Cheong | G06F 1/3256 713/300 |
| 9,026,854 B2 * | 5/2015 | Jeong | G06F 11/221 714/30 |
| 9,170,632 B2 * | 10/2015 | Brooks | G06F 1/3203 |
| 2007/0067445 A1 * | 3/2007 | Vugenfirer | H04L 67/141 709/224 |
| 2010/0325450 A1 | 12/2010 | Kendall et al. | |
| 2012/0191996 A1 | 7/2012 | Cheong | |
| 2013/0145186 A1 | 6/2013 | Chu et al. | |
| 2015/0212562 A1 * | 7/2015 | Guichard | H04W 52/0229 713/310 |
| 2015/0227187 A1 * | 8/2015 | Jeong | G06F 1/3203 713/320 |

OTHER PUBLICATIONS

"L1 PM Substates with CLKREQ", Intel Corporation, Hewlett-Packard Company, Aug. 15, 2012.
N. Nandra, "PCI Express' New Low Power Modes Driving Tablets, Cloud", PCI-SIG Developers Conference, 2012.

* cited by examiner

DEVICES ROUTING WAKEUP SIGNALS USING PHYSICAL LAYER DIRECTLY TO POWER MANAGEMENT CIRCUIT WITHOUT WAKING UP LINK LAYER

CROSS-REFERENCE TO RELATED APPLICATIONS

This application claims priority under 35 U.S.C. §119(a) to Korean Patent Application No. 10-2014-0007877 filed on Jan. 22, 2014, the disclosure of which is hereby incorporated by reference in its entirety.

BACKGROUND

Field

One or more example embodiments of inventive concepts relate to devices for routing wakeup signals using a physical layer for lower power, and more particularly, to devices that directly transmit detection signals associated with wakeup of the device to power management units (or circuits) using only the physical layer and without using a link layer, methods of operating the same, and/or systems including the same.

Description of Conventional Art

A universal flash storage (UFS) is a storage device specially designed for mobile applications and computing systems that require higher performance and lower power consumption. The Joint Electron Device Engineering Council (JEDEC) issued JESD220B UFS 2.0, an updated version of version 1.1 standard announced in 2012, in September 2013. JESD220B UFS 2.0 provides performance improvements, security features extensions, additional power saving features, and increased link bandwidth as compared to the previous version.

The UFS electrical interface is a universal serial communication bus, which may be used for different types of applications. The UFS electrical interface uses a mobile industry processor interface (MIPI®) M-PHY standard as a physical layer for more optimal performance and power.

SUMMARY

Some example embodiments of inventive concepts provide devices including a plurality of physical layers and a link layer, and in which at least one of the plurality of physical layers is configured to transmit a detection signal associated with wakeup of the device directly to a power management circuit without using (or passing through) the link layer. Some example embodiments also provide systems including the devices, methods of operating devices and methods of operating systems.

At least one example embodiment of inventive concepts provides a method of operating a device. The method includes: detecting signals associated with wakeup of the device using a first physical layer from among a plurality of physical layers; generating a detection signal based on the detected signals; and transmitting the detection signal directly to a power management circuit.

According to at least some example embodiments, the first physical layer may be included in logical lane #0 or physical lane #0. The detection signal may be generated using a squelch detector at an analog front end in the first physical layer.

The plurality of physical layers and may be part of a universal flash storage (UFS) interconnect (UIC) layer, which also includes a link layer. The first physical layer may be a mobile industry processor interface (MIPI) M-PHY, and the link layer may be a MIPI UniPro or a MIPI low latency interface (LLI).

The method may further include: cutting off, by the power management circuit, power to a link layer of the device; and supplying, by the power management circuit, power to the link layer in response to the detection signal.

According to at least some example embodiments, the method may further include: cutting off, by the power management circuit, power to a digital front end and a link layer of the device; and supplying, by the power management circuit, power to the digital front end and the link layer in response to the detection signal; wherein the detection signal is transmitted from an analog front end of the device.

The signals associated with the wakeup of the device may transition from DIF-Z to DIF-N. The signals associated with the wakeup of the device may indicate a transition of the device from a HIBERN8 state to one of a SLEEP state and a STALL state.

All of the plurality physical layers except for the first physical layer may be powered off in the HIBERN8 state.

At least one other example embodiment provides a device including: a power management circuit; and a plurality of physical layers, a first of the plurality of physical layers being configured to detect signals associated with a wakeup of the device, and to transmit a detection signal directly to the power management circuit based on the detected signals.

The first physical layer may be included in one of logical lane #0 and physical lane #0; and the first physical layer may include a squelch detector at an analog front end, the squelch detector being configured to generate the detection signal.

The detection signal may be associated with RX_Hibern8Exit_Type-I.

The device may further include a link layer. The power management circuit may be configured to power off the link layer, and to supply power to the link layer in response to the detection signal.

The first physical layer may be a mobile industry processor interface (MIPI). The link layer may be one of a MIPI UniPro and a MIPI low latency interface (LLI).

The first physical layer may be configured to detect a transition of the signals associated with the wakeup of the device from DIF-Z to DIF-N, and to generate the detection signal according to a detection result.

The device may be one of a universal flash storage (UFS), a display, and an image sensor.

At least one other example embodiment provides a data processing system including: a device; an application processor integrated circuit (IC) configured to control the device; and a plurality of lanes connected between the application processor IC and the device. The device includes a power management circuit and a plurality of physical layers. A first of the plurality of physical layers is configured to detect signals associated with a wakeup of the device from the application processor IC, and to transmit a detection signal directly to the power management circuit based on the detected signals.

The device may be a universal flash storage (UFS). The first physical layer may be included in one of logical lane #0 and physical lane #0, and the first physical layer may include a squelch detector at an analog front end. The squelch detector may be configured to generate the detection signal based on the detected signals.

The device may further include a link layer, and the squelch detector may be further configured to transmit the detection signal directly to the power management circuit without passing through the link layer.

The first physical layer may be configured to detect a transition of the signals associated with the wakeup of the device from DIF-Z to DIF-N, and to generate the detection signal according to a detection result.

At least one other example embodiment provides a device including: a power management controller configured to control power to the device based on a wakeup detection signal; and an analog front end circuit at a physical layer of the device, the analog front end circuit being configured to, in response to detection of a wakeup command signal, transmit the wakeup detection signal to the power management controller without passing through a device management entity at a link layer of the device.

The analog front end circuit may include a squelch detector configured to generate the wakeup detection signal based on the wakeup command signal. The power management controller may be configured to control power to the squelch detector and the link layer based on the wakeup detection signal.

The device may further include: a digital front end circuit configured to communicate with the analog front end circuit. The power management controller may be further configured to control power to the digital front end circuit based on the wakeup detection signal.

The device may further include: a digital front end circuit configured to receive the wakeup detection signal from the analog front end circuit, and output the wakeup detection signal to the power management controller without passing through the device management entity.

The device may be a UFS storage device.

BRIEF DESCRIPTION OF THE DRAWINGS

Inventive concepts will become more apparent by describing in detail some example embodiments thereof with reference to the attached drawings in which.

DETAILED DESCRIPTION

Figure 1:
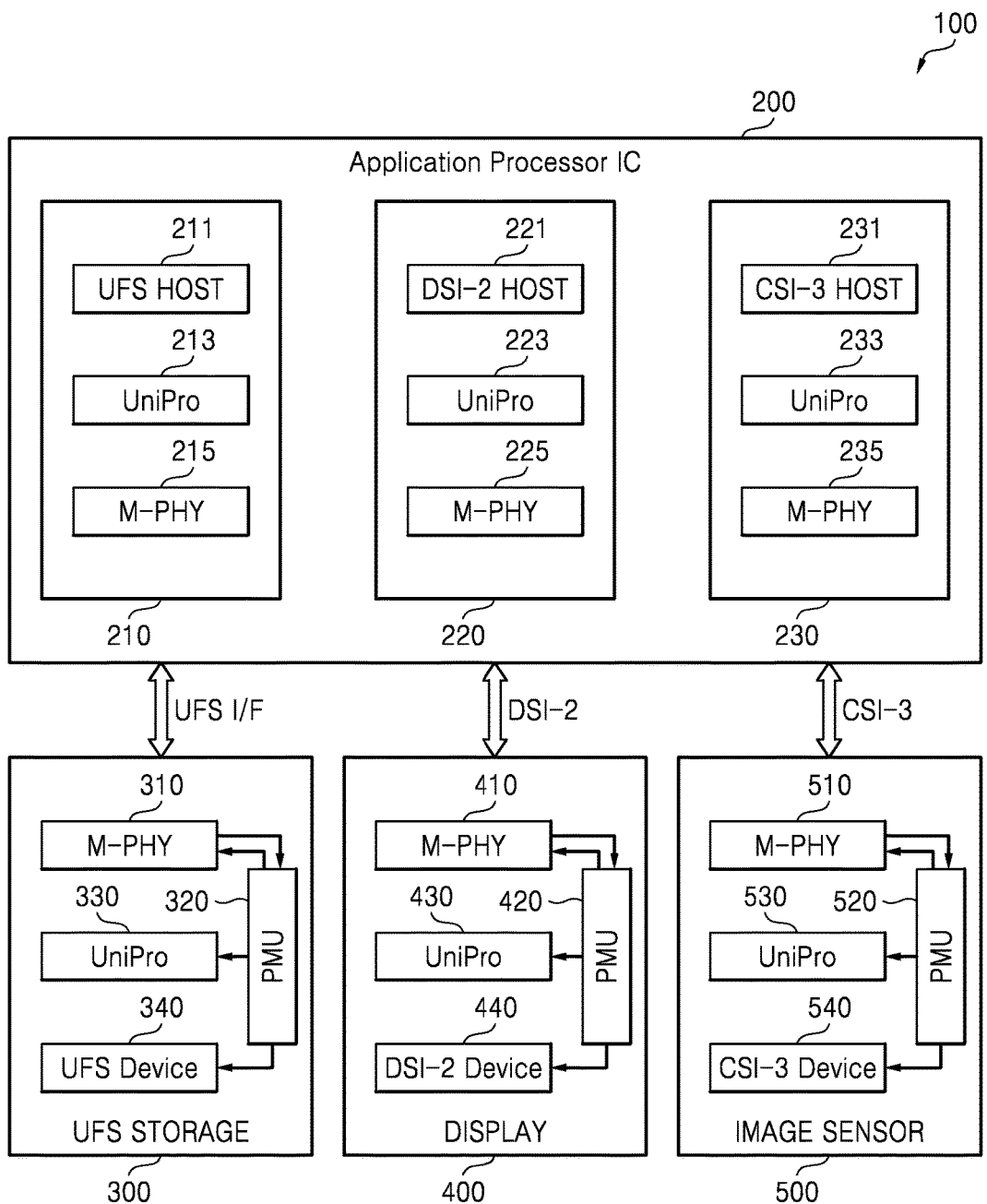
FIG. 1 is a block diagram of a data processing system according to some example embodiments of inventive concepts.

Inventive concepts will now be described more fully hereinafter with reference to the accompanying drawings, in which some example embodiments of the invention are shown. Inventive concepts may, however, be embodied in many different forms and should not be construed as limited to example embodiments set forth herein. Rather, these example embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular example embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As discussed herein, example embodiments and/or one or more components thereof (e.g., physical layer, analog front end, digital front end, squelch detector, receiver circuit, link layer, device management entity, power management unit, power management controller, etc.) may be hardware, firmware, hardware executing software or any combination thereof. In this regard, example embodiments may be described as circuits, units, devices, etc. When example embodiments and/or one or more components thereof are hardware, such hardware may include one or more Central Processing circuits (CPUs), system-on-chips (SOCs), digital signal processors (DSPs), application-specific-integrated-circuits (ASICs), field programmable gate arrays (FPGAs) computers or the like configured as special purpose machines to perform the functions described herein. CPUs, SOCs, DSPs, ASICs and FPGAs may sometimes generally be referred to as processors and/or microprocessors.

The disclosure of universal flash storage (UFS) version 2.0, i.e., JESD220B in the Joint Electron Device Engineering Council (JEDEC) standard published in September 2013 and standard specifications of mobile industry processor interface (MIPI®); that is, M-PHY and UniPro specifications are hereby incorporated by reference in their entirety. For instance, MIPI alliance specification for M-PHY$^{SM}$ version 3.0 and MIPI alliance specification for unified protocol (UniPro$^{SM}$) version 1.6 are hereby incorporated by reference in their entirety.

FIG. 1 is a block diagram of a data processing system 100 according to some example embodiments of inventive concepts. The data processing system 100 may include an application processor integrated circuit (IC) 200 and one or more devices 300, 400, and/or 500.

Referring to FIG. 1, the data processing system 100 may be implemented as a smart phone, a tablet personal computer (PC), a camera, a personal digital assistant (PDA), a digital recorder, an MP3 player, an internet tablet, a mobile internet device (MID), a wearable computer, an electronic toy, etc.

The application processor IC 200 may control the one or more devices 300, 400, and/or 500. In one example, the application processor IC 200 may be implemented as a system on chip (SoC). The application processor IC 200 may include one or more host devices 210, 220, and 230. Here, the host device(s) may be hardware or a circuit implemented in the application processor IC 200.

The first host device 210 may control the operation of the UFS storage 300 through a UFS interface UFS I/F. The first host device 210 may include: a UFS host 211; a link layer 213 (e.g., MIPI UniPro$^{SM}$ or MIPI low latency interface (LLI)); and a physical layer 215 (e.g., MIPI M-PHY$^{SM}$). A UFS interconnect (UIC) layer may include MIPI UniPro$^{SM}$ and/or MIPI LLI (e.g., either MIPI UniPro$^{SM}$ or MIPI LLI and MIPI M-PHY$^{SM}$).

The UFS storage 300 may include: a MIPI M-PHY 310; a power management unit (PMU) 320 (also referred to as a power management circuit, a power management controller, or power management controller circuit); a UniPro 330; and a UFS device 340. The MIPI M-PHY 310 may be included in logical lane #0 or physical lane #0. For instance, the physical lane #0 may be the first physical lane among a plurality of physical lanes. For instance, when there are four physical lanes, the physical lanes may be numbered as physical lane #0, physical lane #1, physical lane #2, and physical lane #3. However, numerical values of physical lanes may not be assigned to physical lanes in the order in which the physical lanes are physically implemented. Rather, numerical values of physical lanes may be assigned randomly or in reverse order. In one example, a reference lane among lanes mapped according to UniPro Link StartUp may be defined as logical lane #0.

In addition, the UniPro specification defines that "Logical Lane Number (M-PHY): A number assigned by a device to its outbound data lane after the Link StartUp sequence. It is used for L1.5 lane mapping whereby only the usable physical lanes are assigned a logical lane number."

According to at least some example embodiments, the UniPro 330 may be replaced with MIPI LLI. Here, a lane may include a lane module (e.g., M-TX) to communicate with a corresponding module (e.g., M-RX) on another chip through a serial interconnect including differential lines.

The MIPI M-PHY 310 may detect signals associated with (or related to) wakeup of the UFS storage 300, which are transmitted through the UFS interface UFS I/F; may generate a detection signal based on the detection result; and may send the detection signal directly to the PMU 320 without passing through the UniPro 330 (or MIPI LLI in some cases).

Power saving modes of the UFS storage 300 may include a first power saving mode and a second power saving mode. The first power saving mode may be a very low-power mode or ultra-low power mode, whereas the second power saving mode may be low power mode or standby mode. Hereinafter, the first power saving mode is referred to as "power saving mode" and the second power saving mode is referred to as "standby mode".

In one example, the power saving mode may include HIBERN8 (or a HIBERN8 state), and the standby mode may include STALL (or a STALL state) for a high-speed mode and SLEEP (or a SLEEP state) for a low-speed mode.

From the viewpoint of the UFS storage 300, the wakeup may be a transition or an entry from the power saving mode (e.g., HIBERN8) to the standby mode (e.g., STALL or SLEEP).

However, the wakeup of the display 400 or the image sensor 500 may be defined differently than the wakeup of the UFS storage 300. Regardless of the definition, wakeup may include a procedure in which the physical layer 410 or 510 transmits a detection signal (or wakeup detection signal) directly to the PMU 320 without passing through a link layer 430 or 530, and the PMU 320 controls power supplied to the physical layer 410 or 510 and/or the link layer 430 or 530 based on the wakeup detection signal.

The PMU 320 may also control the supply of power to each of the elements 310 (physical layer), 330 (link layer), and 340 (UFS device) according to a power mode defined in the UFS storage 300. The UFS device 340 may be a flash-based memory (e.g., NAND flash memory or NOR flash memory).

Still referring to FIG. 1, the second host device 220 may control the operation of the display 400 through display serial interface (DSI)-2. The second host device 220 may include: a DSI-2 host 221; a link layer 223 (e.g., MIPI UniPro$^{SM}$); and a physical layer 225 (e.g., MIPI M-PHY$^{SM}$).

The display 400 may include: a MIPI M-PHY 410; a PMU 420; a UniPro 430; and a DSI-2 device 440. As described above, each of UniPro 223 or 430 may be replaced with a MIPI LLI. In addition, the MIPI M-PHY 410 may be included in logical lane #0 or physical lane #0.

The MIPI M-PHY 410 may detect signals transmitted through the DSI-2, and associated with wakeup of the display 400; may generate a detection signal based on the detected signals; and may send the detection signal directly to the PMU 420 without passing through the UniPro 430.

The PMU 420 may control the supply of power to each of the elements 410 (physical layer M-PHY), 430 (link layer UniPro), and 440 (DSI-2 Device) according to a power mode defined in the display 400. In one example, the DSI-2 device 440 may be a display panel. The display panel may be a thin-film transistor liquid crystal display (TFT-LCD) panel, a light-emitting diode (LED) display panel, an organic LED (OLED) display panel, an active-matrix OLED (AMOLED) display panel, a flexible display panel, or the like.

The third host device 230 may control the operation of the image sensor 500 through camera serial interface (CSI)-3. The third host device 230 may include: a CSI-3 host 231; a link layer 233 (e.g., MIPI UniPro$^{SM}$), and a physical layer 235 (e.g., MIPI M-PHY$^{SM}$).

The image sensor 500 may include: a MIPI M-PHY 510; a PMU 520; a UniPro 530; and a CSI-3 device 540. As described above, each UniPro 233 or 530 may be replaced with a MIPI LLI. In addition, the MIPI M-PHY 510 may be included in logical lane #0 or physical lane #0.

The MIPI M-PHY 510 may detect signals transmitted through the CSI-3, and associated with wakeup of the image sensor 500; may generate a detection signal based on the detected signals; and may send the detection signal directly to the PMU 520 without passing through the UniPro 530.

The PMU 520 may control the supply of power to each of the elements 510 (physical layer MIPI M-PHY), 530 (link layer UniPro), and 540 (CSI-3 Device) according to a power mode defined in the image sensor 500. The CSI-3 device 540 may include a pixel array and peripheral circuits that process pixel signals output from the pixel array. The pixel array may be an active pixel sensor (APS) array.

Each of the PMUs 320, 420, and 520 may function as a power control unit and may be implemented in an integrated circuit (IC).

Figure 2:
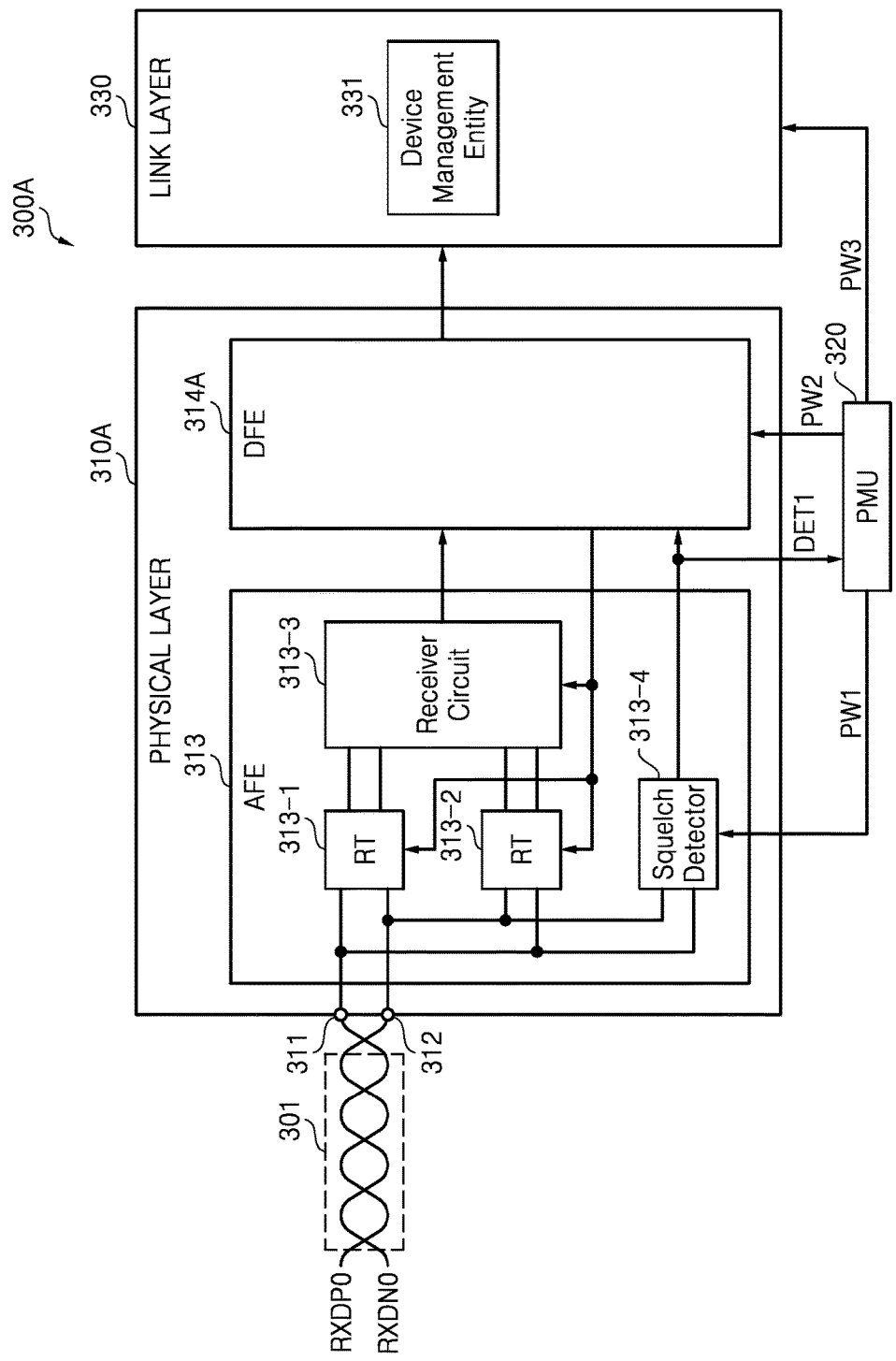
FIG. 2 is a block diagram illustrating an example embodiment of a device including a M-PHY and a power management unit.

FIG. 2 is a block diagram illustrating an example embodiment of a device including a M-PHY and PMU 320.

Referring to FIGS. 1 and 2, the UFS storage 300A is an example of the UFS storage 300 illustrated in FIG. 1. As shown in FIG. 2, the UFS storage 300A includes: a physical layer 310A; the PMU 320; and the link layer 330. For clarity of the description, the discussion of FIG. 2 focuses on the physical layer 310A included in logical lane #0 or physical lane #0 and the link layer 330.

The physical layer 310A includes: input pins 311 and 312; an analog front end (AFE) circuit 313; and a digital front end (DFE) circuit 314A. The input pins 311 and 312 receive differential signals RXDP0 and RXDN0 through an M-RX line 301. In this example, logical lane #0 or physical lane #0 includes the M-RX line 301. The differential signals received through an M-RX line may be referred to as a wakeup command signal.

A terminating resistor 313-1 may be connected to input terminals of a high-speed receiver while a terminating resistor 313-2 may be connected to input terminals of a low-speed receiver. Each of the terminating resistors 313-1 and 313-2 may operate in response to a control signal output from the DFE 314A. A receiver circuit 313-3 may include the high-speed receiver and the low-speed receiver.

A squelch detector 313-4 may detect changes in the differential signals RXDP0 and RXDN0, which are received through the input pins 311 and 312 and associated with wakeup of the device; may generate a detection signal DET1 according to the detection result; and may transmit the detection signal DET1 directly to the PMU 320, without passing through the device management entity 331 and/or the link layer 330. The PMU 320 may supply a first power PW1 to the squelch detector 313-4.

When the UFS storage 300A enters the power saving mode (e.g., HIBERN8), the PMU 320 supplies the first power PW1 to the squelch detector 313-4, cuts off a second power PW2 to the DFE 314A, and cuts off a third power PW3 to the link layer 330. In other words, in the power saving mode, the second power PW2 to the DFE 314A and the third power PW3 to the link layer 330 are cut off, and power is not supplied to the DFE 314A or the link layer 330. The detection signal DET1 is deactivated in the power saving mode. Accordingly, the power consumption of the UFS storage 300A is reduced.

Although the first power PW1 supplied to the squelch detector 313-4 is illustrated in FIG. 2 for clarity of the description, the PMU 320 may supply another power apart from the first power PW1 to the AFE 313 excluding the squelch detector 313-4. For instance, the other power supplied to the AFE 313 excluding the squelch detector 313-4 may be cut off in the power saving mode. However, when the detection signal DET1 is activated, the PMU 320 may supply the second power PW2 to the DFE 314A and the third power PW3 to the link layer 330 in response to the activated detection signal DET1 output directly to the PMU 320 by the squelch detector 313-4.

Still referring to FIG. 2, the link layer 330 includes a device management entity 331. When the detection signal DET1 is activated, the other power may be supplied to the AFE 313 excluding the squelch detector 313-4. Here, activation may indicate a high (e.g., logic) level or a low (e.g., logic) level, whereas deactivation may indicate the other level between the high level and the low level.

The detection signal DET1 may be transmitted directly to the PMU 320 through a signal line newly implemented according to some example embodiments of inventive concepts. The powers PW1, PW2, and PW3 are illustrated in FIG. 2 for clarity of the description. The level of the powers PW1, PW2, and PW3 may be determined according to design specifications.

Figure 3:
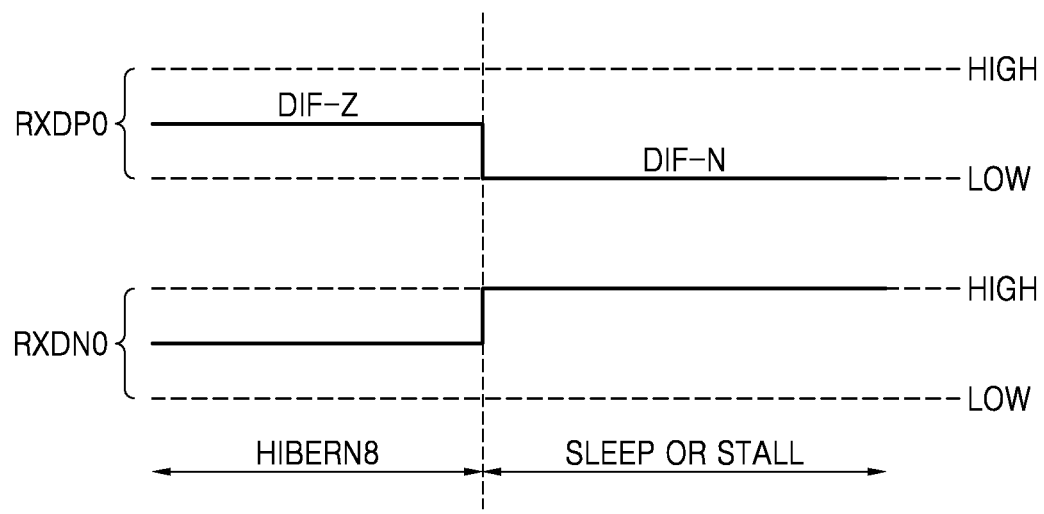
FIG. 3 is a waveform diagram showing example changes in differential signals associated with wakeup according to some example embodiments of inventive concepts.

FIG. 3 is a waveform diagram showing example changes in differential signals associated with wakeup of a device according to some example embodiments of inventive concepts. The wakeup or wake process in which a device transitions from the power saving mode to the standby mode will be described with reference to FIGS. 1 through 3.

Referring to FIGS. 1 through 3, the differential signals RXDP0 and RXDN0 are at a DIF-Z state or level in the power saving mode (e.g., HIBERN8) and change or transition to a DIF-N state or level to initiate wakeup of the device from the power saving mode to the standby mode.

For instance, one (e.g., RXDP0) of the differential signals RXDP0 and RXDN0 transitions from a floating state (e.g., the DIF-Z state) to a low level, and the other (e.g., RXDN0) of the differential signals transitions from a floating state (e.g., the DIF-Z state) to a high level.

The squelch detector 313-4 may detect a change in the differential signals RXDP0 and RXDN0 associated with the wakeup, and output the activated detection signal DET1 according to the detection result.

Figure 4:
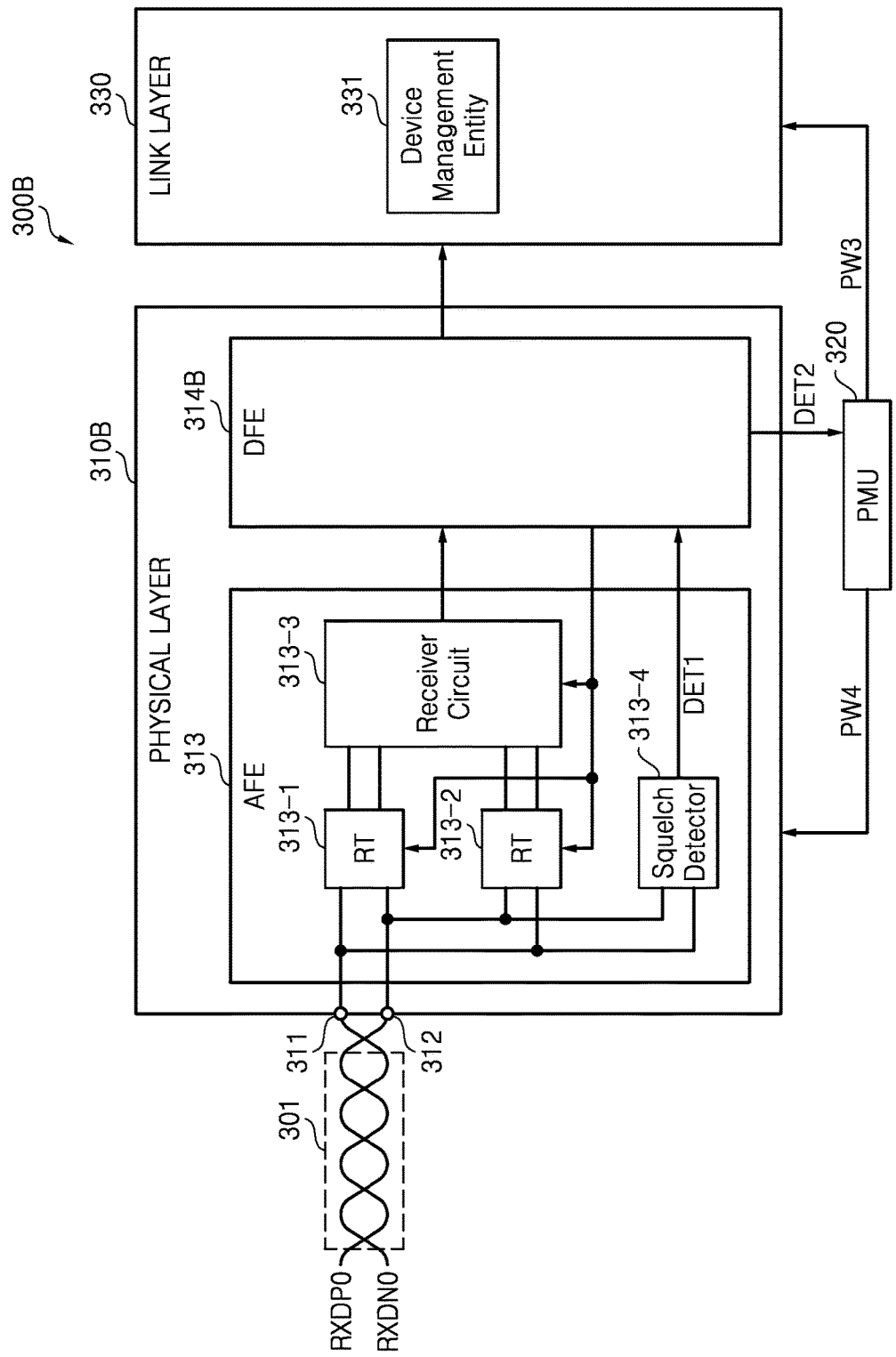
FIG. 4 is a block diagram illustrating another example embodiment of a device including a M-PHY and a power management unit.

FIG. 4 is a block diagram illustrating another example embodiment of a device including a M-PHY and a PMU 320.

Referring to FIG. 4, the UFS storage 300B is another example of the UFS device 300 illustrated in FIG. 1. As shown in FIG. 4, the UFS storage 300B includes: a physical layer 310B; a PMU 320; and a link layer 330. The structure and operation of the UFS storage 300B illustrated in FIG. 4 is similar to the UFS storage 300A illustrated in FIG. 2, except that the DFE 314B transmits the detection signal DET2 directly to the PMU 320 without passing through the link layer 330, and the PMU 320 supplies a fourth power PW4 to the physical layer 313.

In the example embodiment shown in FIG. 4, in the power saving mode, the squelch detector 313-4 may detect a change in the differential signals RXDP0 and RXDN0, which have been received through the input pins 311 and 312 and are associated with wakeup of the device; may generate the detection signal DET1 according to the detection result; and may transmit the detection signal DET1 to the DFE 314B. At this time, the DFE 314B directly outputs the detection signal DET2 related to the detection signal DET1 to the PMU 320. In one example, the detection signal DET2 may be the detection signal DET1 that simply passes through the DFE 314B.

When the UFS storage 300B enters the power saving mode, the PMU 320 maintains the fourth power PW4 supplied to the AFE 313 and the DFE 314B, but cuts off the third power PW3 to the link layer 330. In other words, in the power saving mode (e.g., HIBERN8), the third power PW3 supplied to the link layer 330 is cut off and power is not supplied to the link layer 330. Accordingly, the power consumption of the UFS storage 300B is reduced. For instance, the detection signals DET1 and DET2 may be deactivated. However, when the detection signals DET1 and DET2 are activated, the PMU 320 may supply the third power PW3 to the link layer 330 in response to the activated detection signal DET2 output directly from the DFE 314B to the PMU 320.

The DFE 314B may transmit the detection signal DET2 directly to the PMU 320 without passing through the link layer 330 through a signal line newly implemented according to some example embodiments of inventive concepts. In one example, the detection signals DET1 and DET2 may be RX_Hibern8Exit_Type-I.

The powers PW3 and PW4 are illustrated in FIG. 4 for clarity of the description. The level of the powers PW3 and PW4 may be determined according to design specifications. As described above with reference to FIGS. 1 through 4, while the detection signal DET1 output from the physical layer 310A may be transmitted directly to the PMU 320 without passing through the DFE 314A and the link layer 330, the detection signal DET1 (=DET2) output from the physical layer 310B may be transmitted directly to the PMU 320 without passing through the link layer 330 after passing through the DFE 314B.

Figure 5:
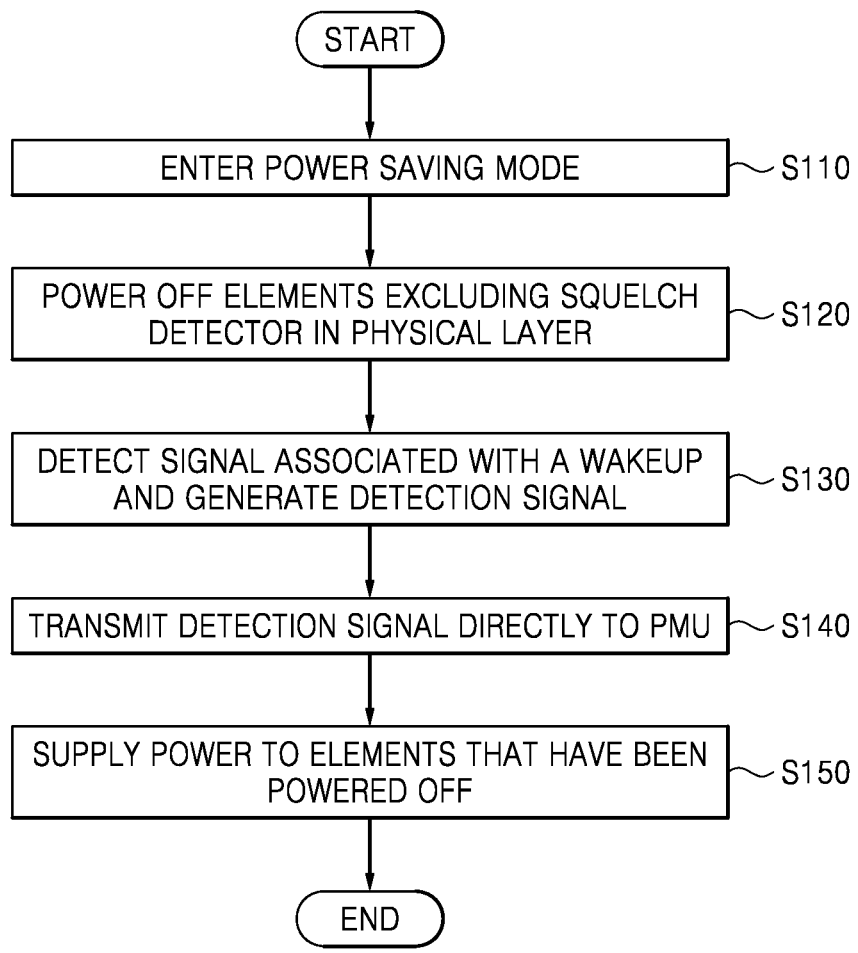
FIG. 5 is a flowchart illustrating a method of operating a data processing system according to some example embodiments of inventive concepts.

FIG. 5 is a flowchart illustrating a method of operating a data processing system according to some example embodiments of inventive concepts.

Referring to FIGS. 1 through 5, in operation S110 the UFS storage 300, 300A, or 300B (collectively denoted by 300) enters the power saving mode (e.g., HIBERN8).

Referring to FIGS. 1, 2, 3, and 5, in the power saving mode, a power supplied to the AFE 313 excluding the squelch detector 313-4, the second power PW2 supplied to the DFE 314A, and the third power PW3 supplied to the link layer 330 are cut off to reduce the power consumption of the UFS storage 300 in operation S120.

In operation S130, the squelch detector 313-4 detects a change (or transition) in the differential signals RXDP0 and RXDN0, which are associated with the wakeup of the device indicating transition from the power saving mode to the standby mode, and generates the detection signal DET1.

In operation S140, the squelch detector 313-4 transmits the detection signal DET1 directly to the PMU 320 without using (or passing through) the link layer 330.

In operation S150, the PMU 320 supplies the powers PW2 and PW3 to the DFE 314A and the link layer 330, respectively, at an appropriate timing in response to the activated detection signal DET1.

Referring now to FIGS. 1, 3, 4, and 5, in the power saving mode according to some example embodiments, the fourth power PW4 is supplied to the physical layer 310B, but the third power PW3 is cut off from the link layer 330 to reduce the power consumption of the UFS storage 300 in operation S120.

In this example, in operation S130, the squelch detector 313-4 detects a change (or transition) in the differential signals RXDP0 and RXDN0 associated with the wakeup of the device, generates the detection signal DET1, and transmits the detection signal DET1 to the DFE 314B. The DFE 314B then generates the detection signal DET2 based on the detection signal DET1.

In one example, the detection signal DET2 may be the same as the detection signal DET1, and the DFE 314B transmits the detection signal DET2 directly to the PMU 320 without using (or passing through) the link layer 330 in operation S140. The PMU 320 supplies the power PW3 to the element 330, which has been powered off, in response to the detection signal DET2 that has been activated in operation S150.

Although the wakeup of the UFS storage 300 has been described above, inventive concepts may be similarly applied to wakeup of the display 400 and wakeup of the image sensor 500. Therefore, descriptions of the wakeup of the display 400 and the wakeup of the image sensor 500 will be omitted.

Figure 6:
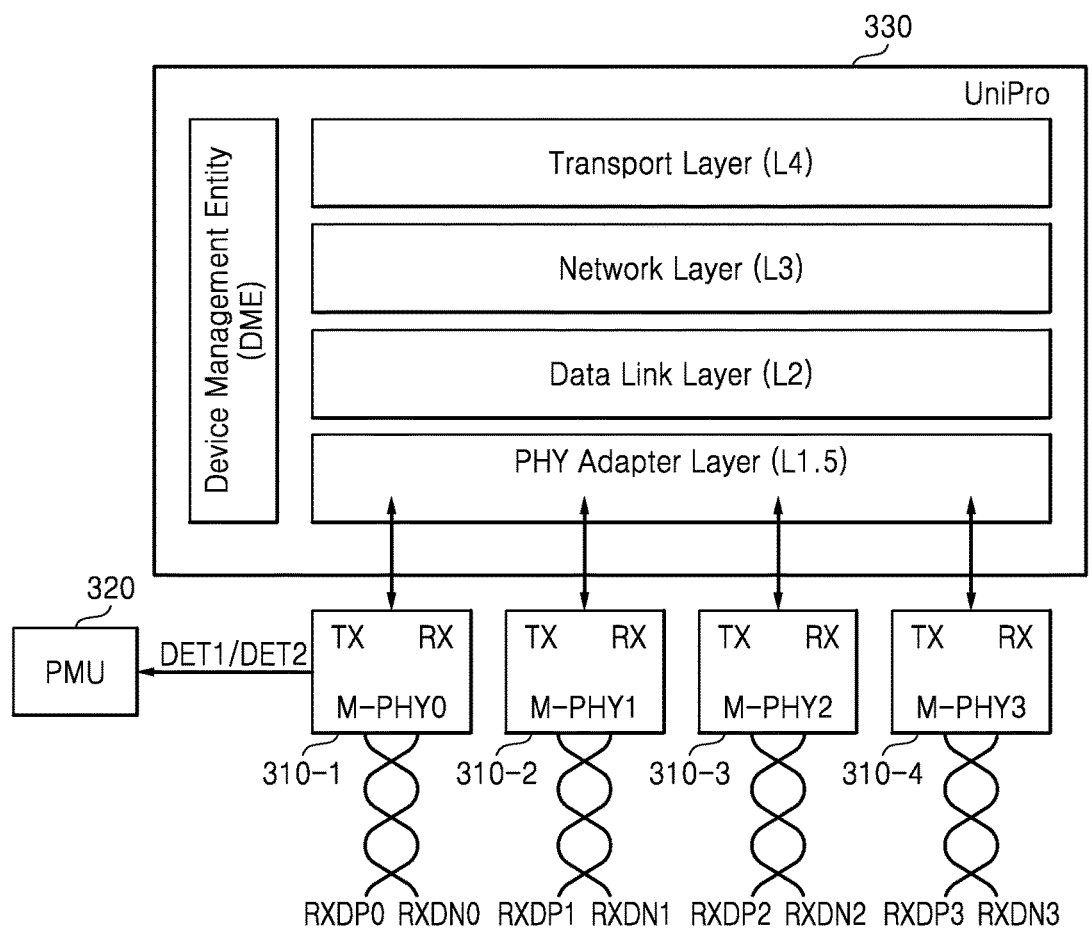
FIG. 6 is a block diagram of a device including four M-PHYs and a power management unit according to some example embodiments of inventive concepts.

FIG. 6 is a block diagram of a device including four M-PHYs 310-1 through 310-4 and the PMU 320 according to some example embodiments of inventive concepts.

Each of the M-PHYs 310-1 through 310-4 receives respective differential signals RXDP0 and RXDN0, RXDP1 and RXDN1, RXDP2 and RXDN2, and RXDP3 and RXDN3 through corresponding M-RX lines. More specifically, M-PHY0 310-1 receives differential signals RXDP0 and RXDN0; M-PHY1 310-2 receives differential signals RXDP1 and RXDN1; M-PHY2 310-3 receives differential signals RXDP2 and RXDN2; and M-PHY3 310-4 receives differential signals RXDP3 and RXDN3. Each of the M-PHYs 310-1 through 310-4 may be included in a corresponding lane. For instance, the M-PHY0 310-1 may be included in logical lane #0 or physical lane #0. The M-PHY0 310-1 may be the physical layer 310A in FIG. 2 or the physical layer 310B in FIG. 4. The detection signal DET1 or DET2 output from the physical layer 310A or 310B may be transmitted directly to the PMU 320 without passing through the link layer 330.

Figure 7:
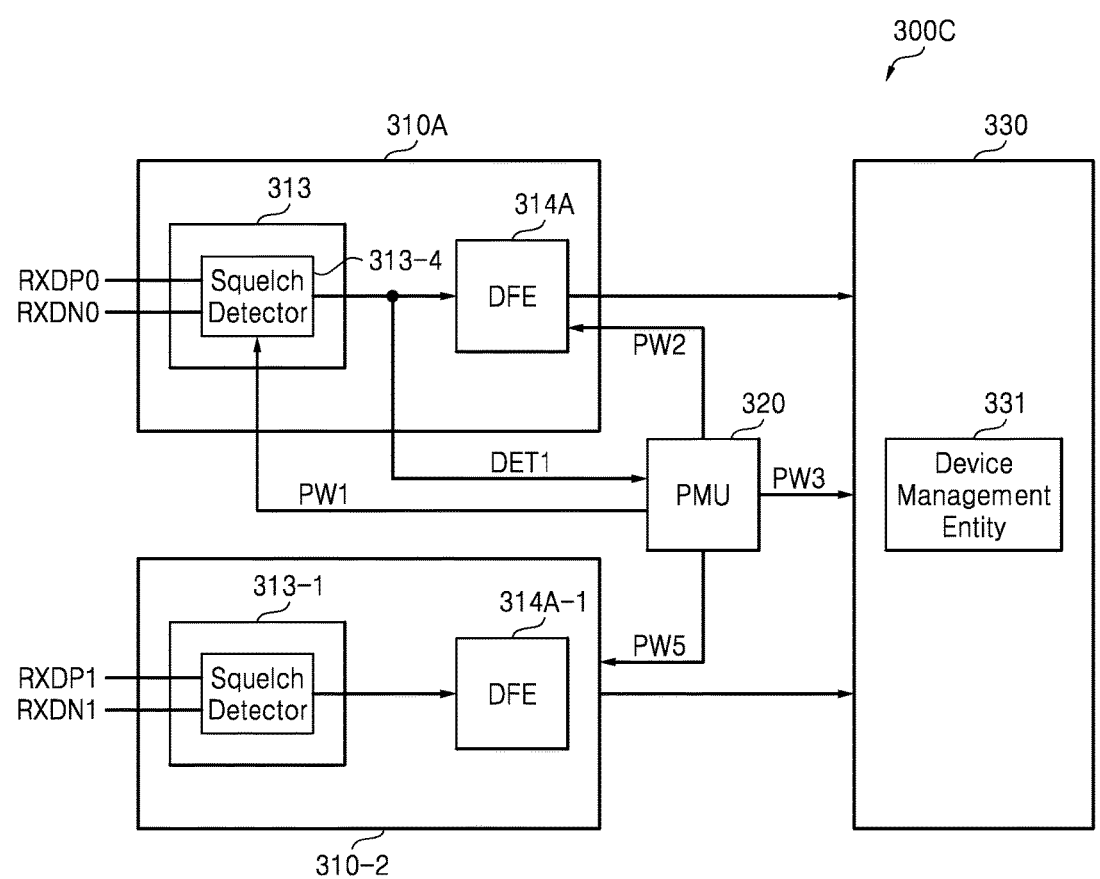
FIG. 7 is a block diagram of a device including two M-PHYs and a power management unit according to some example embodiments of inventive concepts.

FIG. 7 is a block diagram of a device 300C including two M-PHYs and the PMU 320 according to some example embodiments of inventive concepts.

Referring to FIGS. 1, 2, 6, and 7, the device 300C is yet another example embodiment of the UFS storage 300. The UFS storage 300C includes the first physical layer 310A and a second physical layer 310-2.

The structure and operation of the first physical layer 310A illustrated in FIG. 7 is the same or substantially the same as those of the physical layer 310A illustrated in FIG. 2. The structure and operation of the first physical layer 310A and the structure and operation of the second physical layer 310-2 are similar, except for the structure that outputs the detection signal DET1.

In the power saving mode, a fifth power PW5 supplied to the second physical layer 310-2 is cut off to reduce the power consumption of the UFS storage 300C. When the detection signal DET1 is activated, the PMU 320 supplies the fifth power PW5 to the second physical layer 310-2 in response to the detection signal DET1. Since the fifth power PW5 supplied to the AFE 313-1 and a DFE 314A-1 in the second physical layer 310-2 is cut off in the power saving mode, the power consumption of the second physical layer 310-2 is reduced.

Figure 8:
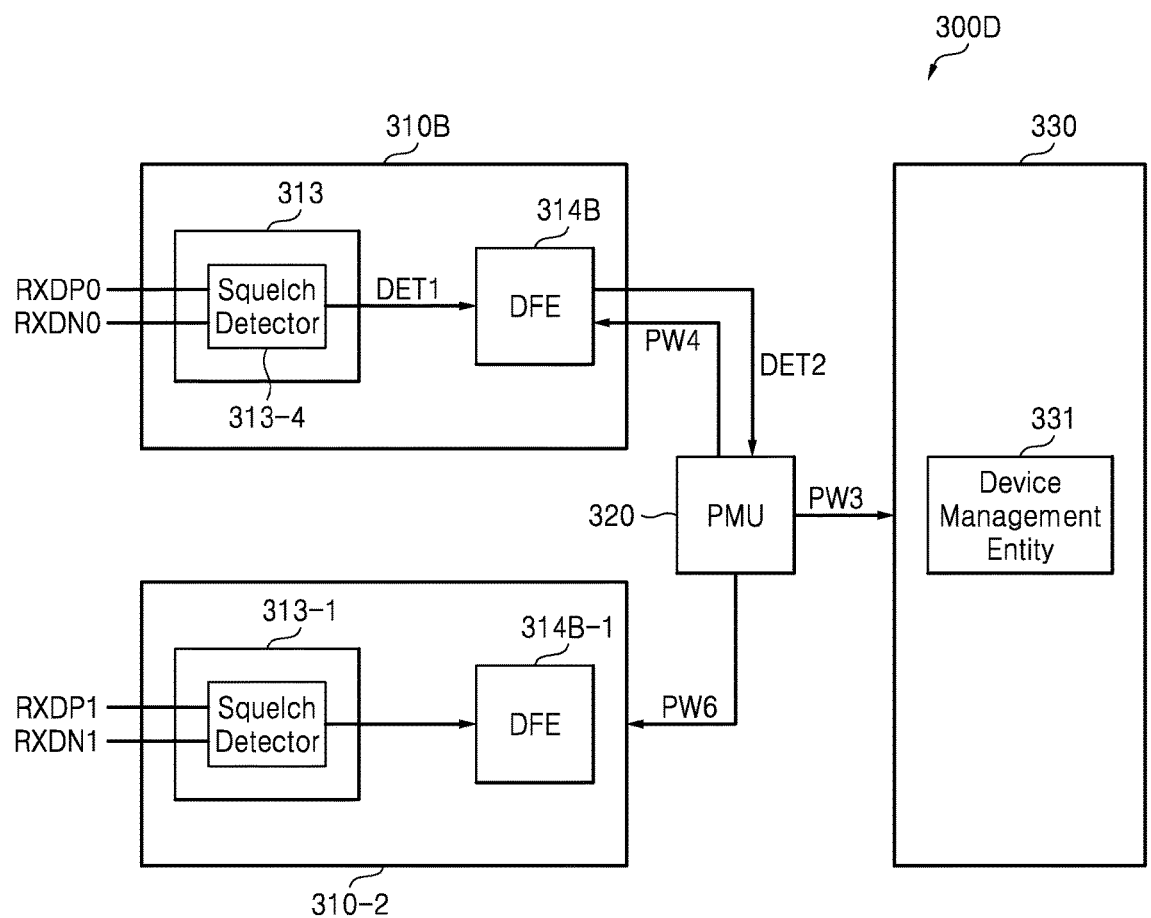
FIG. 8 is a block diagram of a device including two M-PHYs and a power management unit according to other example embodiments of inventive concepts.

FIG. 8 is a block diagram of a device 300D including two M-PHYs and the PMU 320 according to other example embodiments of inventive concepts.

Referring to FIGS. 1, 4, 6, and 8, the device 300D is still another example embodiment of the UFS storage 300. The UFS storage 300D includes the first physical layer 310B and the second physical layer 310-2.

The structure and operation of the first physical layer 310B illustrated in FIG. 8 are the same or substantially the same as those of the physical layer 310B illustrated in FIG. 4. The structure and operation of the first physical layer 310B and the structure and operation of the second physical layer 310-2 are similar, except for the structure that outputs the detection signal DET2.

In the power saving mode, a sixth power PW6 supplied to the second physical layer 310-2 is cut off to reduce the power consumption of the UFS storage 300D. When the detection signal DET2 is activated, the PMU 320 supplies the sixth power PW6 to the second physical layer 310-2 in response to the detection signal DET2. Since the sixth power PW6 supplied to the AFE 313-1 and a DFE 314B-1 in the second physical layer 310-2 is cut off in the power saving mode, the power consumption of the second physical layer 310-2 is reduced.

As described above, according to some example embodiments of inventive concepts, a device including a plurality of physical layers and a link layer generates a detection signal associated with a wakeup of the device using a first physical layer among the plurality of physical layers, and transmits the detection signal directly to a PMU without using (or passing through) the link layer, so that the device may cut off power to the link layer in a very low-power mode (e.g., HIBERN8). As a result, the power consumption of the device may be reduced.

In addition, not only the power to the link layer, but also power to part of the physical layer, may be cut off in the very low-power mode so that power consumption of the device may be further reduced. Since the device performs a wakeup without using (or passing through) the link layer in the very low-power mode, wakeup time may also be reduced.

While inventive concepts have been particularly shown and described with reference to some example embodiments thereof, it will be understood by those of ordinary skill in the art that various changes in forms and details may be made therein without departing from the spirit and scope of inventive concepts as defined by the following claims.

What is claimed is:

1. A device comprising:
a power management circuit; and
a plurality of physical layers, a first of the plurality of physical layers being configured to detect changes in signals associated with a wakeup of the device, and to transmit a detection signal directly to the power management circuit based on the detection.

2. The device of claim 1, wherein:
the first physical layer is included in one of logical lane #0 and physical lane #0; and
the first physical layer includes a squelch detector at an analog front end, the squelch detector being configured to generate the detection signal.

3. The device of claim 1, wherein the detection signal is associated with RX_Hibern8Exit_Type-I.

4. The device of claim 1, further comprising:
a link layer, wherein
the power management circuit is configured to power off the link layer, and to supply power to the link layer in response to the detection signal.

5. The device of claim 4, wherein:
the first physical layer is a mobile industry processor interface (MIPI); and
the link layer is one of a MIPI UniPro and a MIPI low latency interface (LLI).

6. The device of claim 1, wherein the first physical layer is further configured to detect a transition of the signals associated with the wakeup of the device from DIF-Z to DIF-N, and to generate the detection signal according to a detection result.

7. The device of claim 1, wherein the device is one of a universal flash storage (UFS), a display, and an image sensor.

8. A data processing system comprising:
a device;
an application processor integrated circuit (IC) configured to control the device;
a plurality of lanes connected between the application processor IC and the device; and
wherein the device includes,
a power management circuit, and
a plurality of physical layers, a first of the plurality of physical layers being configured to detect changes in signals associated with a wakeup of the device from the application processor IC, and to transmit a detection signal directly to the power management circuit based on the detection.

9. The data processing system of claim 8, wherein the device is a universal flash storage (UFS).

10. The data processing system of claim 8, wherein:
the first physical layer is included in one of logical lane #0 and physical lane #0; and
the first physical layer includes a squelch detector at an analog front end, the squelch detector being configured to generate the detection signal based on the detection.

11. The data processing system of claim 10, wherein the device further comprises:
a link layer, wherein
the squelch detector is further configured to transmit the detection signal directly to the power management circuit without passing through the link layer.

12. The data processing system of claim 11, wherein:
the first physical layer is a mobile industry processor interface (MIPI); and
the link layer is one of a MIPI UniPro and a MIPI low latency interface (LLI).

13. The data processing system of claim 8, wherein the first physical layer is further configured to detect a transition of the signals associated with the wakeup of the device from DIF-Z to DIF-N, and to generate the detection signal according to a detection result.

14. The data processing system of claim 8, wherein the signals associated with the wakeup of the device indicate transition of the device from a HIBERN8 state to one of a SLEEP state and STALL state.

15. The data processing system of claim 14, wherein all of the plurality of physical layers, except for the first physical layer, are powered off in the HIBERN8 state.

16. A device comprising:
a power management controller configured to control power to the device based on a wakeup detection signal; and
an analog front end circuit at a physical layer of the device, the analog front end circuit being configured to generate the wakeup detection signal in response to detection of changes in a wakeup command signal, and to transmit the wakeup detection signal to the power management controller without passing through a device management entity at a link layer of the device.

17. The device of claim 16, wherein:
the analog front end circuit includes a squelch detector configured to generate the wakeup detection signal based on the detected changes in the wakeup command signal; and
the power management controller is configured to control power to the squelch detector and the link layer based on the wakeup detection signal.

18. The device of claim 17, further comprising:
a digital front end circuit configured to communicate with the analog front end circuit; wherein
the power management controller is further configured to control power to the digital front end circuit based on the wakeup detection signal.

19. The device of claim 16, further comprising:
a digital front end circuit configured to receive the wakeup detection signal from the analog front end circuit, and output the wakeup detection signal to the power management controller without passing through the device management entity.

20. The device of claim 16, wherein the device is a UFS storage device.

* * * * *